Figure 4:
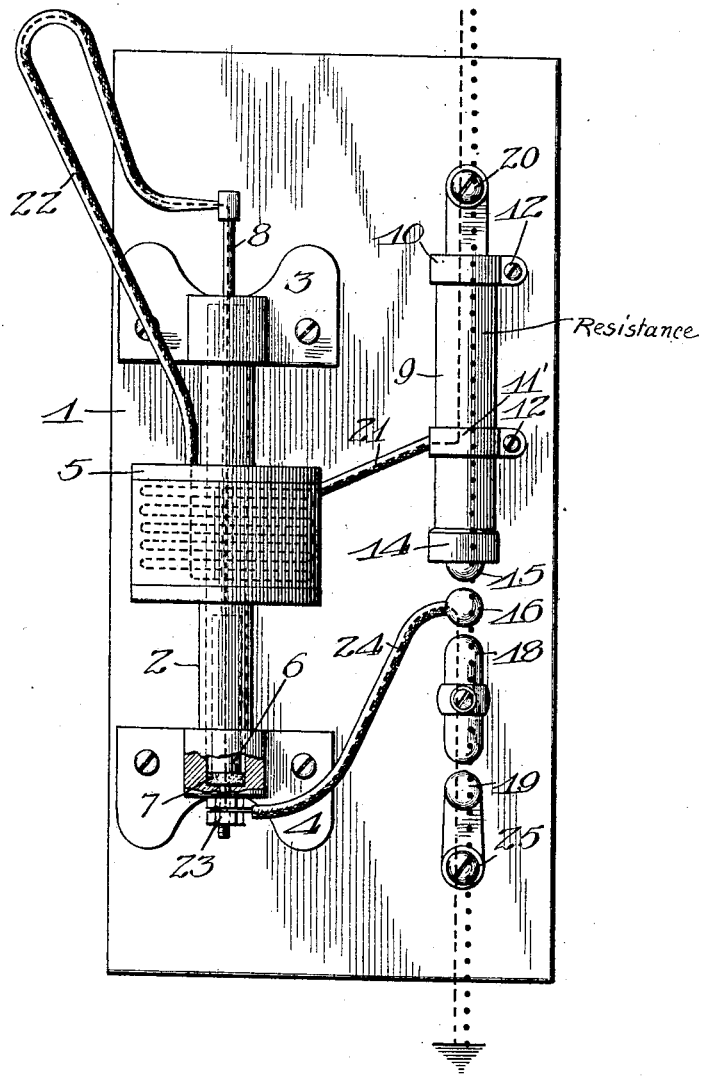

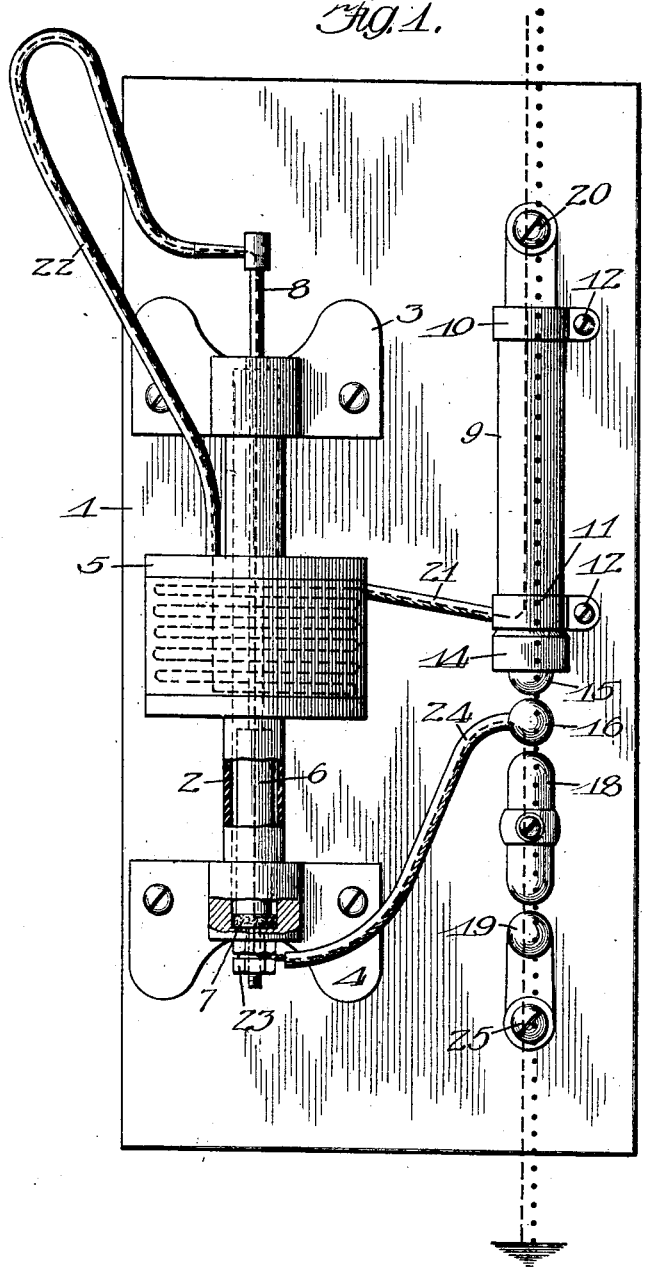

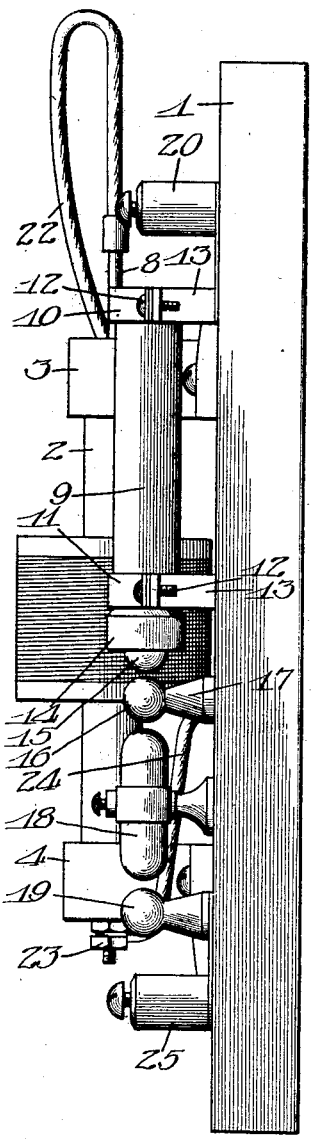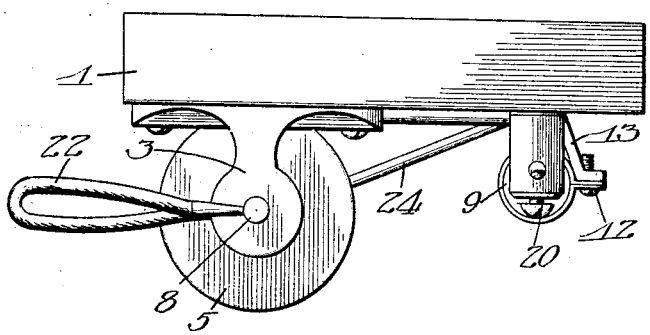

No. 897,906. PATENTED SEPT. 8, 1908.
F. P. H. KNIGHT.
LIGHTNING ARRESTER.
APPLICATION FILED JUNE 28, 1907.

3 SHEETS—SHEET 3.

Witnesses:

Inventor:
F. P. H. Knight
by Jones, Addington & Ames,
Attorneys

UNITED STATES PATENT OFFICE.

FRANK P. H. KNIGHT, OF KEOKUK, IOWA, ASSIGNOR TO ELECTRIC SERVICE SUPPLIES COMPANY, OF CAMDEN, NEW JERSEY, A CORPORATION OF NEW JERSEY.

LIGHTNING-ARRESTER.

No. 897,906.      Specification of Letters Patent.      Patented Sept. 8, 1908.

Application filed June 28, 1907. Serial No. 381,279.

*To all whom it may concern:*

Be it known that I, FRANK P. H. KNIGHT, a citizen of the United States, residing at Keokuk, in the county of Lee and State of Iowa, have invented new and useful Improvements in Lightning-Arresters, of which the following is a full, clear, concise, and exact description, reference being had to the accompanying drawing, forming a part of this specification.

My invention relates to improvements in protective devices such as are applied to various forms of electrical apparatus for the purpose of disrupting arcs which may form between contacts.

Particularly applicable is my invention to lightning arresters whose duty it is, as well known, to prevent injury to machines or other apparatus connected to the line due to a static discharge, such as lightning. The usual way of effecting this result is by providing a separate path for the discharge which it is compelled to follow. As this path does not include the apparatus to be protected, the latter is kept beyond reach of the destructive influence of the discharge. However, in lightning arresters efficient for this purpose the great difficulty has been experienced that the line-current tends to follow the discharge, and maintains a short-circuit to the ground by keeping up the arc or arcs across the discharging electrodes of the arrester. Various schemes have been resorted to, with more or less success to check this tendency of the line current to follow the discharge, but I conceived the idea of drawing the arc of the normal or line-current away from the discharge-gap by a shunt path of lower resistance than said discharging-gap and breaking it mechanically, and without affecting the discharge-path during the operation of the circuit-breaker.

In order that my invention may be fully understood, I will now give a detailed description of the same, reference being had to the accompanying drawings, in which Figure 1 is a face view of one form of my invention; Fig. 2 is a top view thereof, while Fig. 3 is a side view of the same; and Fig. 4 is a face view of a modified form of my invention.

Although the drawings show the different parts of the device mounted upon the insulating base or panel 1, it is to be understood that certain of the parts (as, for instance, the circuit breaker) might just as well be located upon a separate support. The insulating tube 2 is held in place by brackets 3 and 4 which engage said tube at the upper and lower ends, respectively. Surrounding the tube and carried thereby, is an electromagnetic coil 5 whose winding is in Fig. 1 indicated diagrammatically for a purpose hereinafter explained. This coil, when energized, actuates the magnetic core or plunger 6 which is capable of longitudinal movement in the tube 2. The core is adapted to rest normally upon the upper end of a carbon button 7 in the bottom of the tube. In this, its normal position, the core is below the coil so as to be drawn up by the latter upon flow of current therethrough. The upper end of the core carries a rod 8, of brass or other non-magnetic conductive material, projecting through an opening in the top of the tube.

The resistance-rod 9 is secured to the base by metallic clamps or brackets 10, 11, which, in turn, are held in place by screws or bolts 12 threaded into arms or extensions 13 on the base. These arms also serve to space the resistance-rod from the surface of the base. The lower end of this rod terminates in a metal cap 14 having a hemispherical projection 15 which constitutes one of a series of metallic discharge-electrodes. Separated from electrode 15 by a sufficient air-gap, is the spherical electrode 16 carried by a standard 17, as shown in Fig. 3. Then comes the cylindrical electrode 18, followed by another spherical electrode 19. This precise arrangement of the discharge-electrodes, also their number and shape, is here set forth by way of illustration only, and as not being of the essence of my invention. This will become apparent as the specification proceeds.

We come now to the electrical connections of the apparatus. One of the line terminals is connected to the binding post 20, which is electrically connected to the metallic clamp 10 and, therefore, to the resistance-rod 9. One end of the coil 5 is connected to the lower end of rod 9 by the conductor 21, while the other end of the coil is connected to the rod 8 through the flexible conductor 22. A suitable binding post 23 is electrically connected with the carbon button 7. Discharge-electrode 16 is in electric connection with the binding post 23 by means of the conductor 24.

The operation of the device is as follows: A lightning or similar discharge on the line-wire will follow the path indicated by the dotted line in Fig. 1, to wit, from binding post 20, through resistance-rod 9, across the air-gaps formed by the discharge-electrodes 15, 16, 18 and 19, to the binding post 25, (which is electrically connected with electrode 19) and finally to the ground. The static discharge takes the above traced path in preference to a path through the coil 5, for the reason that such discharge, being oscillatory in its nature, would encounter too high a self-inductance in attempting to pass through the winding of the coil. The path across the air gaps is the path of least resistance for the discharge. Now, with the arcs established across the air-gaps, the normal or line-current follows the path indicated by the dashed line in Fig. 1, to wit, from binding post 20 through resistance-rod 9, conductor 21, through coil 5, conductor 22, rod 8, core 6, carbon button 7, binding post 23, conductor 24, electrode 16, across an air-gap to electrode 18, across a second air-gap to electrode 19 binding post 25, and thence to the ground. The coil 5, therefore, becomes energized and raises its core 6, away from the contact 7. As the core and the contact 7 are in series with the spark-gaps between electrodes 16, 18 and 19, this separation of the core from contact 7 interrupts the flow of normal current to the ground and deënergizes the coil. As a consequence, the core drops to its normal position, and the instrument is reset to repeat the operation above set forth upon the passage of another discharge.

It will be noticed that the circuit through the coil 5 is in shunt to the air-gap formed between electrodes 15 and 16. But, in view of the fact that the resistance of this shunt-path is considerably lower than the resistance between the electrodes 15 and 16, the normal current chooses the path through the coil, and is thus drawn away from the spark-gap between electrodes 15 and 16. It will further be noticed that I provide a permanent path for the discharge, as clearly indicated by the dotted lines in Figs. 1 and 4. I call this discharge path permanent for the simple reason that it remains unchanged or unaffected during the operation of the circuit-breaker. In other words, whatever the position of the movable core 6, whether in contact with the carbon button 7 or separated therefrom as when breaking the normal arc, the discharge path always remains in the same condition to permit the passage of static or abnormal current to the ground.

The specific embodiment of my invention as herein described in detail, is for the sake of illustration only, and is nowise intended to place a limitation upon the scope of the invention as defined in the appended claims. As already stated, the exact number, or configuration, or position of the discharge-electrodes is purely a matter of choice or skill, and may be varied to suit circumstances. Then, again, it is not necessary that only one spark-gap be shunted by the circuit-breaker: I may shunt two or more spark-gaps, as desired, or found expedient. Nor is it essential that a plurality of spark-gaps be arranged below the shunted one; a single spark-gap might be found to be sufficient. Furthermore, the position of the series spark-gaps may be altered in several ways, without affecting the operation of the device. Thus, for instance, at least one spark-gap may be located on the upper end of the resistance-rod, and still be in series with the coil 5. In some cases, I may prefer to include in the shunt path a part of the resistance-rod 9 in order to divert sufficient normal current through the coil to properly actuate the armature. Such an arrangement is illustrated in Fig. 4, where one end of the coil 5 is connected by conductor 21 with the bracket 11' which is so situated on the resistance 9 that part of the same is in the shunt path of the normal current. Lastly, I do not wish to limit myself to the solenoid type of circuit-breaker in shunt with an air gap or air-gaps; as any approved form of automatic circuit-breaker may be used with all the advantages herein mentioned, and without departing from my invention as set forth in the following claims. I will but add that by the term "automatic circuit-breaker", as herein used, I mean a circuit-breaker designed to automatically open the circuit and immediately close it.

Having thus described my invention, what I claim as new and desire to secure by Letters Patent of the United States is:

1. In a lightning-arrester, the combination with an automatic circuit-breaker adapted to open the circuit and again close the same and operated by the normal current, of a permanent discharge-path associated with said circuit-breaker.

2. In a lightning-arrester, the combination with a discharge-path, of an automatic circuit-breaker adapted to open the circuit and again close the same and operated by the normal current and in shunt to a portion of said discharge path, whereby said discharge-path remains unaffected during the operation of the circuit-breaker.

3. In a lightning-arrester, the combination with an automatic circuit-breaker adapted to open the circuit and again close the same and having separable contacts to disrupt the normal arc, of a permanent discharge-path associated with said circuit-breaker.

4. The combination with a discharge-path, of an automatic circuit-breaker in shunt to a portion of said discharge-path and having separable contacts to disrupt the normal arc, whereby said discharge-path remains unaffected during the operation of the circuit-breaker.

5. In a lightning arrester, the combination with discharge-electrodes having air-gaps therebetween, of a shunt-path for drawing the arc of the normal current away from one or more of said air-gaps, and means for automatically interrupting the flow of normal current in said shunt-path.

6. In a lightning arrester, the combination with discharge-electrodes having air-gaps therebetween, of an automatic circuit-breaker in shunt to one or more of said air-gaps and adapted to be operated by the normal current, for interrupting the flow of normal current in said shunt.

7. In a lightning arrester, the combination with a discharge-path having air-gaps therein, of a path for the normal current in shunt to one or more of said air-gaps and in series with the other of said air-gaps, and means operated by normal current for disrupting the normal arc across said last-mentioned air-gaps, said discharge-path remaining unaffected during the operation of said disrupting means.

8. In a lightning arrester, the combination with a discharge-path having air-gaps therein, of a path for the normal current in shunt to one or more of said air-gaps and in series with the other of said air-gaps, and means operated by normal current and included in said path for disrupting the normal arc across said last-mentioned air-gaps, said discharge-path remaining unaffected during the operation of said disrupting means.

9. In a lightning arrester, the combination with a discharge-path having air-gaps therein, of a path for the normal current in shunt to one or more of said air-gaps and in series with the other of said air gaps, and an automatic circuit-breaker included in said path for disrupting the normal arc across said last-mentioned air-gaps, said discharge-path remaining unaffected during the operation of said circuit-breaker.

10. In a lightning arrester, the combination with discharge-electrodes having air-gaps therebetween, of a magnet-coil in shunt to one or more of said air-gaps, said shunt-path having a lower resistance than the air-gap shunted thereby, so as to draw the arc of the normal current away from said shunted air-gap or air-gaps, and means actuated by said magnet-coil for interrupting the flow of normal current in said shunt-path.

11. In a lightning arrester, the combination with a discharge-path having air-gaps therein, of a path for the normal current in shunt to one or more of said gaps and in series with the other of said air-gaps, a magnet coil in said path, and means actuated by said coil for disrupting the normal arc across said last-mentioned air-gaps, said discharge-path remaining unaffected during the operation of said disrupting means.

12. In a lightning arrester, the combination with discharge-electrodes having air-gaps therebetween, of a shunt-path for drawing the arc of the normal current away from one or more of said air-gaps, and means for opening the circuit of the normal current in the shunt path.

13. In a lightning arrester, the combination with a discharge-path having air-gaps therein, of a path for the normal current in shunt to one or more of said air-gaps and in series with the other of said air-gaps, and means for mechanically disrupting the normal arc across said last-mentioned air-gaps, said discharge-path remaining unaffected during the operation of said disrupting means.

14. In a lightning arrester, the combination with a discharge-path having air-gaps therein, of a path for the normal current in shunt to one or more of said air-gaps and in series with the other of said air-gaps, and means included in said path for mechanically disrupting the normal arc across said last-mentioned air-gaps, said discharge-path remaining unaffected during the operation of said disrupting means.

15. In a lightning arrester, the combination with a discharge-path including a resistance and a plurality of discharge-electrodes having air-gaps therebetween, of a path for the normal current in shunt to part of said resistance and to one or more of the air-gaps, for drawing the arc of the normal current away from said last-mentioned air-gaps.

16. In a lightning arrester, the combination with a discharge-path including a resistance and a plurality of discharge-electrodes having air-gaps therebetween, of a path for the normal current in shunt to part of said resistance and to one or more of the air-gaps, and an automatic circuit-breaker in said shunt path for interrupting the flow of normal current therein.

17. In a lightning arrester, the combination with a discharge-path including a resistance and a plurality of discharge-electrodes having air-gaps therebetween, of a path for the normal current in shunt to part of said resistance and to one or more of the air-gaps, and in series with the other of the air-gaps, and an automatic circuit-breaker in said shunt path for disrupting the normal arc across said last-mentioned air-gaps.

18. In a lightning arrester, the combination with a discharge-path including a resistance and a plurality of discharge-electrodes having air-gaps therebetween, of a path for the normal current in shunt to part of said resistance and to one or more of the air-gaps, and in series with the other of the air-gaps, a magnet-coil in said shunt, and means actuated by said coil for disrupting the normal arc across said last-mentioned air-gaps.

19. In a lightning-arrester, the combination with a discharge-path including a resistance and a plurality of discharge-electrodes having air-gaps therebetween, of a path for the normal current in shunt to one or more of the air-gaps, and an automatic circuit-breaker in said shunt path for interrupting the flow of normal current therein, said circuit breaker being operated by the normal current.

20. In a lightning-arrester, the combination with a discharge-path including a resistance and a plurality of discharge-electrodes having air-gaps therebetween, of a path for the normal current in shunt to one or more of the air-gaps and in series with said resistance and the other of the air-gaps, and an automatic circuit-breaker in said shunt path for interrupting the flow of normal current therein.

21. In a lightning-arrester, the combination with a discharge-path including a resistance and a plurality of discharge-electrodes having air-gaps therebetween, of a path for the normal current in shunt to one or more of the air-gaps and in series with said resistance and the other of the air-gaps, a magnet-coil in said shunt, and means actuated by said coil for interrupting the flow of normal current in said shunt path.

In witness whereof, I have hereunto subscribed my name in the presence of two witnesses.

FRANK P. H. KNIGHT.

Witnesses:
W. B. WILSON,
G. W. COX.